US012331416B2

(12) United States Patent
Sakai et al.

(10) Patent No.: US 12,331,416 B2
(45) Date of Patent: Jun. 17, 2025

(54) COMPRESSION APPARATUS FOR HYDROGEN-CONTAINING GAS UTILIZING AN ANODE SEPARATOR ARRANGEMENT

(71) Applicant: Panasonic Intellectual Property Management Co., Ltd., Osaka (JP)

(72) Inventors: Osamu Sakai, Osaka (JP); Hiromi Kita, Nara (JP); Takashi Kakuwa, Osaka (JP); Takayuki Nakaue, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 262 days.

(21) Appl. No.: 18/183,071

(22) Filed: Mar. 13, 2023

(65) Prior Publication Data

US 2023/0213027 A1   Jul. 6, 2023

Related U.S. Application Data

(63) Continuation of application No. PCT/JP2021/026543, filed on Jul. 15, 2021.

(30) Foreign Application Priority Data

Sep. 25, 2020   (JP) ................. 2020-161296

(51) Int. Cl.
  *C25B 9/67*   (2021.01)
  *C25B 1/02*   (2006.01)
  (Continued)

(52) U.S. Cl.
  CPC ............. *C25B 9/67* (2021.01); *C25B 1/02* (2013.01); *C25B 1/04* (2013.01); *F04B 39/06* (2013.01)

(58) Field of Classification Search
  CPC ........ B01D 2256/16; Y02E 60/36; C25B 1/02; C25B 9/67; C25B 9/73; F04B 35/04; F04B 39/06
  See application file for complete search history.

(56) References Cited

U.S. PATENT DOCUMENTS

2010/0213051 A1 *   8/2010   Ishikawa ............. H01M 8/2483
                                                                204/252
2016/0130708 A1     5/2016   Daimon et al.
(Continued)

FOREIGN PATENT DOCUMENTS

JP   2015-117139   6/2015
JP   2016-089229   5/2016
(Continued)

OTHER PUBLICATIONS

The EPC Office Action dated Aug. 7, 2024 for the related European Patent Application No. 21871950.8.
(Continued)

*Primary Examiner* — Nathan C Zollinger
(74) *Attorney, Agent, or Firm* — Rimon P.C.

(57) ABSTRACT

A compression apparatus includes an electrolyte membrane, an anode provided on a first principal surface of the electrolyte membrane, a cathode provided on a second principal surface of the electrolyte membrane, an anode separator provided on the anode, a cathode separator provided on the cathode, and a voltage applier that applies a voltage between the anode and the cathode. The compression apparatus causes, by using the voltage applier to apply a voltage, protons taken out from a hydrogen-containing gas that is supplied to the anode to move to the cathode via the electrolyte membrane and produces compressed hydrogen. The anode separator has a first flow channel, provided in a
(Continued)

principal surface thereof facing away from the anode, through which a cooling fluid flows.

13 Claims, 8 Drawing Sheets

(51) Int. Cl.
*C25B 1/04* (2021.01)
*F04B 39/06* (2006.01)

(56) References Cited

U.S. PATENT DOCUMENTS

| | | | |
|---|---|---|---|
| 2018/0100243 A1* | 4/2018 | Yakumaru | H01M 8/0245 |
| 2020/0340471 A1 | 10/2020 | Nakaue et al. | |
| 2021/0376339 A1 | 12/2021 | Kawabata et al. | |

FOREIGN PATENT DOCUMENTS

| | | |
|---|---|---|
| JP | 2018-062707 | 4/2018 |
| JP | 2018-190496 | 11/2018 |
| WO | 2020/095836 A1 | 5/2020 |
| WO | 2020/153022 | 7/2020 |

OTHER PUBLICATIONS

International Search Report of PCT application No. PCT/JP2021/026543 dated Aug. 24, 2021.

Takanobu Ikeda et al., "Basic Study on Hydrogen Separation and Compression Characteristics by Polymer Electrolyte Membrane", Journal of the Institute of Electrical Engineers of Japan B vol. 126, No. 9, Dec. 1, 2006, pp. 926-932.

* cited by examiner

COMPRESSION APPARATUS FOR HYDROGEN-CONTAINING GAS UTILIZING AN ANODE SEPARATOR ARRANGEMENT

BACKGROUND

1. Technical Field

The present disclosure relates to a compression apparatus.

2. Description of the Related Art

In recent years, due to environmental problems such as global warming and energy problems such as depletion of oil resources, hydrogen has drawn attention as a clean alternative energy source that replaces fossil fuels. Hydrogen is expected to serve as clean energy, as it basically produces only water even at the time of combustion, does not emit carbon dioxide, which is responsible for global warming, and hardly emits nitrogen oxides or other substances. Further, as devices that utilize hydrogen as a fuel with high efficiency, fuel cells are being developed and becoming widespread for use in automotive power supplies and in-house power generation.

For example, for use as a fuel in a fuel-cell vehicle, hydrogen is in general compressed into a high-pressure state of several tens of megapascals and stored in an in-vehicle hydrogen tank. Moreover, such high-pressure hydrogen is obtained, in general, by compressing low-pressure (normal pressure) hydrogen with a mechanical compression apparatus.

Incidentally, in a hydrogen-based society to come, there is demand for technological development that makes it possible to, in addition to producing hydrogen, store hydrogen at high densities and transport or utilize hydrogen in small amounts and at low cost. In particular, hydrogen-supply infrastructures need to be built to expedite the widespread use of fuel cells, and for stable supply of hydrogen, various suggestions are made for the production, purification, and high-density storage of high-purity hydrogen.

Under such circumstances, for example, Japanese Unexamined Patent Application Publication No. 2015-117139 proposes an electrochemical hydrogen pump in which the purification and pressure rising of hydrogen in a hydrogen-containing gas are performed by applying a desired voltage between an anode and a cathode that are placed with an electrolyte membrane sandwiched therebetween. It should be noted that a stack of a cathode, an electrolyte membrane, and an anode is referred to as "membrane-electrode assembly" (hereinafter abbreviated as "MEA"). At this point in time, the hydrogen-containing gas that is supplied to the anode may have an impurity mixed therein. For example, the hydrogen-containing gas may be hydrogen gas secondarily produced from an iron-making factory or other places, or may be reformed gas produced by reforming city gas.

Further, for example, Japanese Patent No. 6129809 proposes a high-differential-pressure water electrolysis apparatus in which low-pressure hydrogen generated through the electrolysis of water is subjected to pressure rising using an MEA.

SUMMARY

One non-limiting and exemplary embodiment provides a compression apparatus that makes it possible to more appropriately place a flow channel through which a cooling fluid for keeping a compression unit at an appropriate temperature flows than has conventionally been the case.

In one general aspect, the techniques disclosed here feature a compression apparatus including an electrolyte membrane, an anode provided on a first principal surface of the electrolyte membrane, a cathode provided on a second principal surface of the electrolyte membrane, an anode separator provided on the anode, a cathode separator provided on the cathode, and a voltage applier that applies a voltage between the anode and the cathode. The compression apparatus causes, by using the voltage applier to apply a voltage, protons taken out from a hydrogen-containing gas that is supplied to the anode to move to the cathode via the electrolyte membrane and produces compressed hydrogen. The anode separator has a first flow channel, provided in a principal surface thereof facing away from the anode, through which a cooling fluid flows.

The compression apparatus according to the aspect of the present disclosure can bring about an effect of making it possible to more appropriately place a flow channel through which a cooling fluid for keeping a compression unit at an appropriate temperature flows than has conventionally been the case.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Figure 1:
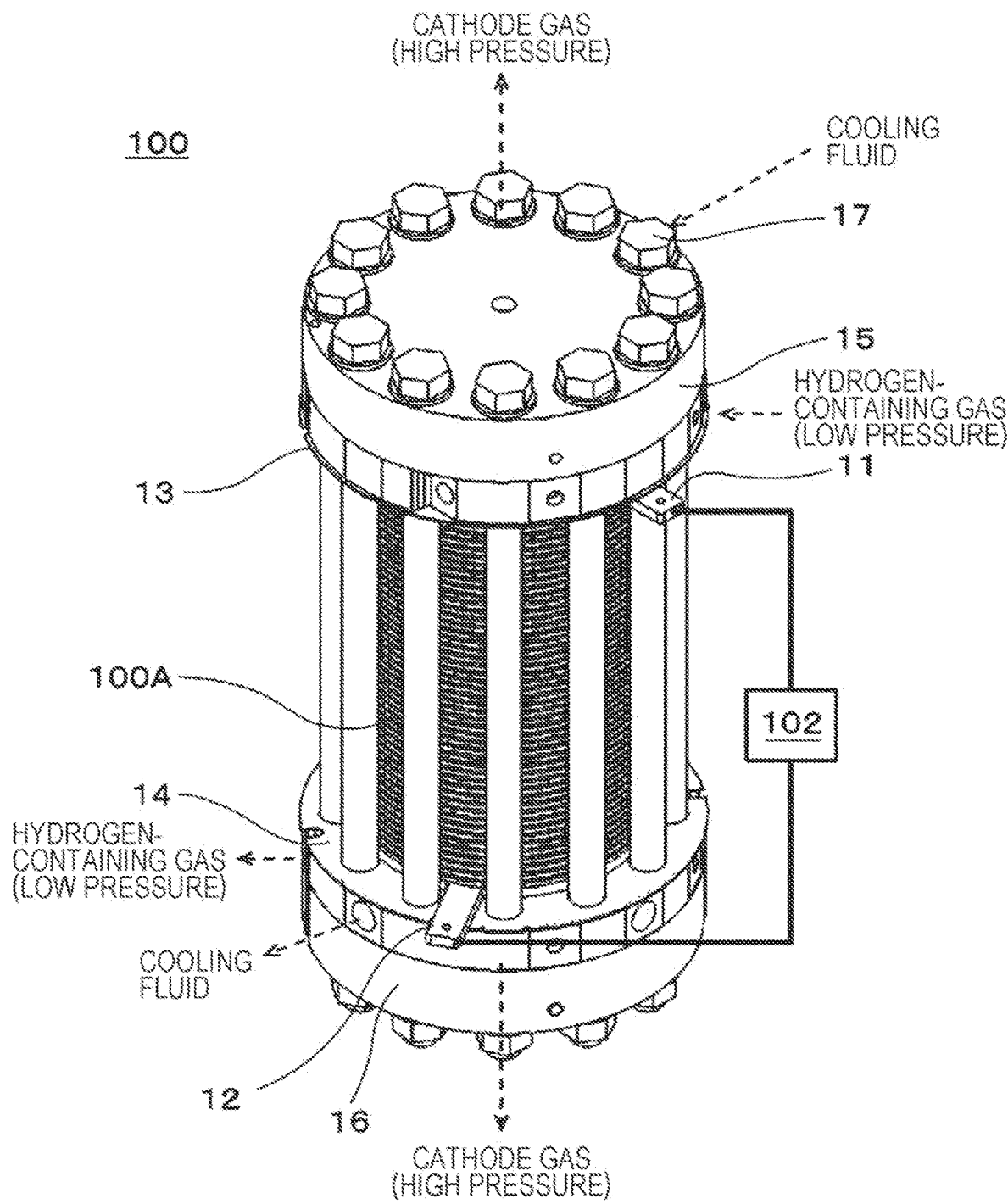
FIG. 1 is a perspective view showing an example of an electrochemical hydrogen pump according to an embodiment.

In an electrochemical compression apparatus based on a solid polymer electrolyte membrane (hereinafter referred to as "electrolyte membrane"), protons ($H^+$) taken out from an anode fluid that is supplied to an anode move to a cathode via the electrolyte membrane, and high-pressure (e.g. approximately several tens of megapascals) compressed hydrogen ($H_2$) is generated at the cathode. At this point in time, in general, the electrolyte membrane in a cell (compression unit) of the compression apparatus has increased proton conductivity under predetermined temperature conditions and humidification conditions, so that the compression unit has improved efficiency in hydrogen compression operation. Accordingly, in many cases, a flow channel through which a cooling fluid for keeping the temperature of a compression unit at an appropriate temperature flows is provided in the compression unit.

Incidentally, in such a compression unit, compressed hydrogen in the cathode is high in pressure. Therefore, when a flow channel through which a cooling fluid flows is provided in the compression unit, it is necessary to give consideration to the pressure resisting design of members constituting the compression unit, the cost of the members, or other matters.

That is, a compression apparatus according to a first aspect of the present disclosure is a compression apparatus including: an electrolyte membrane; an anode provided on a first principal surface of the electrolyte membrane; a cathode provided on a second principal surface of the electrolyte membrane; an anode separator provided on the anode; a cathode separator provided on the cathode; and a voltage applier that applies a voltage between the anode and the cathode, wherein the compression apparatus causes, by using the voltage applier to apply a voltage, protons taken out from a hydrogen-containing gas that is supplied to the anode to move to the cathode via the electrolyte membrane and produces compressed hydrogen, and the anode separator has a first flow channel, provided in a principal surface thereof facing away from the anode, through which a cooling fluid flows.

According to such a configuration, the compression apparatus according to the present aspect makes it possible to more appropriately place a first flow channel through which a cooling fluid for keeping a compression unit at an appropriate temperature flows than has conventionally been the case.

Specifically, by having the first flow channel, through which the cooling fluid flows, in the principal surface of the anode separator facing away from the anode, the compression apparatus according to the present aspect makes it unnecessary to place a dedicated plate provided with such a first flow channel. Therefore, the compression apparatus according to the present aspect can make apparatus costs lower than in a case where such a dedicated plate is placed.

Further, if the aforementioned first flow channel is provided in a principal surface of the cathode separator facing away from the cathode, there is a need to provide the cathode separator with a recess for use as the first flow channel; however, in a region in which this recess is provided, the cathode separator has a decreased thickness. Meanwhile, since a principal surface of the cathode separator facing toward the cathode is exposed to the high-pressure compressed hydrogen, there is a need to increase the rigidity of the cathode separator in the aforementioned region. For example, although it is possible to increase the rigidity in the aforementioned region by increasing the overall thickness of the cathode separator, this may invite increases in size and cost of the apparatus.

On the other hand, a principal surface of the anode separator facing toward the anode is only exposed to a low-pressure anode fluid. Therefore, by having the first flow channel provided in the principal surface of the anode separator facing away from the anode, the compression apparatus according to the present aspect can alleviate the foregoing inconvenience.

A compression apparatus according to a second aspect of the present disclosure may be directed to the compression apparatus according to the first aspect, wherein the anode separator has a first manifold through which a cathode gas containing the compressed hydrogen flows and a first communicating path, provided in the principal surface thereof facing away from the anode, that leads the cathode gas to the first manifold.

According to such a configuration, the compression apparatus according to the present aspect can appropriately supply the high-pressure cathode gas to the first manifold of the anode separator from the cathode above the cathode separator through the first communicating path of the anode separator.

A compression apparatus according to a third aspect of the present disclosure may be directed to the compression apparatus according to the first aspect, wherein the cathode separator has a second manifold through which a cathode gas containing the compressed hydrogen flows and a second communicating path, provided in a principal surface thereof facing away from the cathode, that leads the cathode gas to the second manifold.

According to such a configuration, the compression apparatus according to the present aspect can appropriately supply the high-pressure cathode gas to the second manifold of the cathode separator from the cathode above the cathode separator through the second communicating path of the cathode separator.

A compression apparatus according to a fourth aspect of the present disclosure may be directed to the compression apparatus according to the second aspect, wherein the first flow channel is configured to surround part of the first communicating path, the part including an upstream end of the first communicating path.

Although it is desirable to uniformly place the first flow channel in an opposite electrode section of the anode separator in order to reduce the occurrence of unevenness in temperature within the MEA due to the cooling fluid, it is necessary that the first communicating path and the first flow channel not interfere with each other. In particular, since the high-pressure cathode gas flows through the first communicating path, it is desirable to lay the first communicating path and the first flow channel so that they are not too close to each other.

For this reason, if, in the anode separator, the first flow channel is not provided in such a way as to surround part of the first communicating path, the part of the first communicating path includes an upstream end of the first communicating path (hereinafter referred to as "part of the first communicating path"), there is a possibility of occurrence of unevenness in temperature in a portion of the MEA situated close to the part of the first communicating path. This may cause a decrease in efficiency of hydrogen compression operation of the compression apparatus.

To address this problem, as noted above, the compression apparatus according to the present aspect is configured such that in the anode separator, the first flow channel is placed in such a way as to surround part of the first communicating path. This allows the compression apparatus according to the present aspect to further reduce the occurrence of unevenness in temperature within the MEA than in a case where the first flow channel does not surround part of the first communicating path.

A compression apparatus according to a fifth aspect of the present disclosure may be directed to the compression apparatus according to the third aspect, wherein the principal surface of the anode separator facing away from the anode has a region facing the second communicating path, and the first flow channel is configured to surround part of the region, the part including an end facing an upstream end of the second communicating path.

Although it is desirable to uniformly place the first flow channel in the opposite electrode section of the anode separator in order to reduce the occurrence of unevenness in temperature within the MEA due to the cooling fluid, it is necessary that the second communicating path and the first flow channel not interfere with each other. In particular, since the high-pressure cathode gas flows through the second communicating path, it is desirable to lay the second communicating path and the first flow channel so that they are not too close to each other.

For this reason, if, in the anode separator, the principal surface of the anode separator facing away from the anode has a region facing the second communicating path but the first flow channel is not disposed to surround part of the region including an end facing an upstream end of the second communicating path (hereinafter referred to as "part of the region facing the upstream end of the second communicating path), there is a possibility of occurrence of unevenness in temperature in a portion of the MEA situated close to the part of the region facing the upstream end of the second communicating path. This may cause a decrease in efficiency of hydrogen compression operation of the compression apparatus.

To address this problem, as noted above, the compression apparatus according to the present aspect is configured such that in the anode separator, the first flow channel is placed in such a way as to surround part of the region facing the upstream end of the second communicating path. This allows the compression apparatus according to the present aspect to further reduce the occurrence of unevenness in temperature within the MEA than in a case where the first flow channel does not surround part of the region facing the upstream end of the second communicating path.

A compression apparatus according to a sixth aspect of the present disclosure may be directed to the compression apparatus according to the fourth or fifth aspect, wherein the first flow channel has a serpentine flow channel including two shuttling paths and one shuttling path which is located between the two shuttling paths, an amplitude of each of the two shuttling paths is greater than an amplitude of the one shuttling path, and the part is surrounded by the two shuttling paths and the one shuttling path.

According to such a configuration, by being configured such that with a serpentine flow channel including two shuttling paths and one shuttling path which is located between the two shuttling paths, an amplitude of each of the two shuttling paths is greater than an amplitude of the one shuttling path, and the part is surrounded by the two shuttling paths and the one shuttling path, the compression apparatus according to the present aspect can further reduce the occurrence of unevenness in temperature within the MEA than in a case where the serpentine flow channel does not surround the aforementioned part.

A compression apparatus according to a seventh aspect of the present disclosure may be directed to the compression apparatus according to the fourth or fifth aspect, wherein the first flow channel has a first linear flow channel provided with a bypass that bypasses the part, and is configured such that the part is surrounded by the bypass.

According to such a configuration, by being configured such that the bypass surrounds part of the first communicating path or part of the region facing the upstream end of the second communicating path, the compression apparatus according to the present aspect can further reduce the occurrence of unevenness in temperature within the MEA than in a case where the bypass does not surround the aforementioned part.

A compression apparatus according to an eighth aspect of the present disclosure may be directed to the compression apparatus according to the seventh aspect, wherein a pitch between the first linear flow channel and a second linear flow channel adjacent internally to the first linear flow channel is greater than a pitch between the second linear flow channel and a third linear flow channel adjacent internally to the second linear flow channel.

According to such a configuration, the compression apparatus according to the present aspect can cool a wider region than in a case where flow channels are placed at equal pitches, and can therefore further reduce the occurrence of unevenness in temperature within the MEA.

A compression apparatus according to a ninth aspect of the present disclosure may be directed to the compression apparatus according to the seventh aspect, wherein the bypass has upstream and downstream ends having convex shapes curved outward.

According to such a configuration, the compression apparatus according to the present aspect can further reduce the occurrence of unevenness in temperature within the MEA than in case where the upstream and downstream ends of the bypass do not have convex shapes curved outward.

A compression apparatus according to a tenth aspect of the present disclosure may be directed to the compression apparatus according to any one of the first to ninth aspects, wherein the anode separator has a second flow channel, provided in a principal surface thereof facing toward the anode, through which the hydrogen-containing gas flows, and the first flow channel and the second flow channel are equal in flow channel width and flow channel depth to each other.

According to such a configuration, by being configured such that the first flow channel and the second flow channel are set to be equal in flow channel width and flow channel depth to each other, the compression apparatus according to the present aspect makes it possible to reduce the manufacturing cost of the anode separator.

For example, the first flow channel and the second flow channel can be made in the two principal surfaces, respectively, of the anode separator under the same processing conditions using the same processing apparatus. For example, in a case where the first flow channel and the second flow channel are formed by an etching method, the two principal surfaces of the anode separator can be processed under the same etching conditions in a single etching apparatus if the first flow channel and the second flow channel have identical shapes.

The following describes embodiments of the present disclosure with reference to the accompanying drawings. It should be noted that the embodiments to be described below illustrate examples of the aforementioned aspects. Therefore, the shapes, materials, constituent elements, placement and topology of constituent elements, or other features that are shown below are just a few examples and, unless recited in the claims, are not intended to limit the aforementioned aspects. Further, those of the following constituent elements which are not recited in an independent claim representing the most generic concept of the aforementioned aspects are described as optional constituent elements. Further, a description of those constituent elements given the same reference signs in the drawings may be omitted. The drawings schematically show constituent elements for ease of comprehension and may not be accurate representations of shapes, dimensional ratios, or other features.

Embodiment

The aforementioned anode fluid of the compression apparatus may be any of various types of gas or liquid. For example, in a case where the compression apparatus is an electrochemical hydrogen pump, the anode fluid may be a hydrogen-containing gas. Alternatively, for example, in a case where the compression apparatus is a water electrolysis apparatus, the anode fluid may be liquid water.

Accordingly, the following embodiment describes the configuration and operation of an electrochemical hydrogen pump including a hydrogen pump unit as an example of the aforementioned compression apparatus including a compression unit in a case where the anode fluid is a hydrogen-containing gas.

Apparatus Configuration

FIG. 1 is a perspective view showing an example of an electrochemical hydrogen pump according to an embodiment.

As shown in FIG. 1, the electrochemical hydrogen pump 100 includes a stack 100A in which a plurality of hydrogen pump units 10 (see FIG. 2) are stacked on top of each other and a voltage applier 102.

Note here that in the electrochemical hydrogen pump 100 according to the present embodiment, a plate that functions as an anode separator and a plate that functions as a cathode separator are integrated with each other. Specifically, each bipolar plate 29 (see FIG. 2) includes a plate that functions as a cathode separator of one of adjacent hydrogen pump units 10 and a plate that functions as an anode separator of the other of the adjacent hydrogen pump units 10.

As shown in FIG. 1, in a common stacked and fastened structure, the hydrogen pump units 10 are stacked on top of each other, the stack 100A is sandwiched between a pair of end plates 15 and 16 with a pair of feeding plates 11 and 12 and a pair of insulating plates 13 and 14 interposed on both sides of the stack 100A, and the two end plates 15 and 16 are fastened to each other with a plurality of fasteners 17.

Note here that in order to supply an appropriate amount of hydrogen-containing gas to each of the hydrogen pump units 10 from outside, it is necessary to cause an appropriate pipe line to branch off into groove-shaped flow channels in each of the anode separators and connect these flow channels to a first end of a gas flow channel provided in an opposite electrode section of each of the anode separators. Such a pipe line is called "anode gas lead-in manifold", and this anode gas lead-in manifold is constituted, for example, by a series of through-holes provided at appropriate points in members constituting the stack 100A. Moreover, in the electrochemical hydrogen pump 100, a hydrogen-containing gas having flowed into the electrochemical hydrogen pump 100 is distributed to each of the hydrogen pump units 10 through the anode gas lead-in manifold, whereby the hydrogen-containing gas is supplied to the anode of the hydrogen pump unit 10 through the anode gas lead-in manifold. Further, in order to externally emit, from each of the hydrogen pump units 10, an excess of hydrogen-containing gas having passed through the hydrogen pump unit 10, it is necessary to cause an appropriate pipe line to branch off into groove-shaped flow channels in each of the anode separators and connect these flow channels to a second end of the gas flow channel provided in the opposite electrode section of each of the anode separators. Such a pipe line is called "anode gas lead-out manifold", and this anode gas lead-out manifold is constituted, for example, by a series of through-holes provided at appropriate points in members constituting the stack 100A. Moreover, in the electrochemical hydrogen pump 100, portions of the hydrogen-containing gas having passed through the hydrogen pump units 10 meet at the anode gas lead-out manifold, whereby the hydrogen-containing gas is emitted out of the electrochemical hydrogen pump 100 through the anode gas lead-out manifold.

Further, in order to externally emit a cathode gas containing high-pressure compressed hydrogen from the cathode of each of the cathode separators, it is necessary to configure each of the cathode separators such that an appropriate pipe line and an appropriate communicating path are coupled to each other. Such a pipe line is called "cathode lead-out manifold", and the cathode lead-out manifold is constituted, for example, by a series of through-holes provided at appropriate points in members constituting the stack 100A.

Furthermore, in order to supply an appropriate amount of cooling fluid (e.g. cooling water) to each of the hydrogen pump units 10 from outside, it is necessary to cause an appropriate pipe line to branch off into groove-shaped flow channels in each of the anode separators and connect these flow channels to a first end of a cooling fluid flow channel provided in the opposite electrode section of each of the anode separators. Such a pipe line is called "cooling fluid lead-in manifold", and this cooling fluid lead-in manifold is constituted, for example, by a series of through-holes provided at appropriate points in members constituting the stack 100A. Moreover, in the electrochemical hydrogen pump 100, a cooling fluid having flowed into the electrochemical hydrogen pump 100 is distributed to each of the hydrogen pump units 10 through the cooling fluid lead-in manifold, whereby the cooling fluid is supplied to the hydrogen pump unit 10 through the cooling fluid lead-in manifold. Further, in order to externally emit, from each of the hydrogen pump units 10, a portion of the cooling fluid having passed through the hydrogen pump unit 10, it is necessary to cause an appropriate pipe line to branch off into groove-shaped flow channels in each of the anode separators and connect these flow channels to a second end of the cooling fluid flow channel provided in the opposite electrode section of each of the anode separators. Such a pipe line is called "cooling fluid lead-out manifold", and this cooling fluid lead-out manifold is constituted, for example, by a series of through-holes provided at appropriate points in members constituting the stack 100A. Moreover, in the electrochemical hydrogen pump 100, portions of the cooling fluid having passed through the hydrogen pump units 10 meet at the cooling fluid lead-out manifold, whereby the cooling fluid is emitted out of the electrochemical hydrogen pump 100 through the cooling fluid lead-out manifold.

The configuration of the bipolar plates 29, the hydrogen pump units 10, and the manifolds will be described in detail later.

The voltage applier 102 is a device that applies a voltage between the anodes and cathodes of the hydrogen pump units 10. Specifically, a high potential of the voltage applier 102 is applied to the anodes, and a low potential of the voltage applier 102 is applied to the cathodes. The voltage applier 102 may be configured in any way as long as it can apply a voltage between the anodes and the cathodes. For example, the voltage applier 102 may be a device that adjusts a voltage that is applied between the anodes and the cathodes. In this case, the voltage applier 102 includes a DC/DC converter when it is connected to a direct-current power source such as a battery, a solar cell, or a fuel cell, or includes an AC/DC converter when it is connected to an alternate-current power source such as a commercial power source.

Alternatively, the voltage applier 102 may be an electricity-powered power source by which a voltage that is applied between the anodes and the cathodes and an electric current that flows between the anodes and the cathodes are adjusted so that electric power of a predetermined set value is supplied to the hydrogen pump units 10.

In the example shown in FIG. 1, the voltage applier 102 has its low-potential terminal connected to the feeding plate 11 and has its high-potential terminal connected to the feeding plate 12. The feeding plate 11 is in electrical contact with a cathode separator located at a first end in the direction of stacking, and the feeding plate 12 is in electrical contact with an anode separator located at a second end in the direction of stacking.

Thus, in the electrochemical hydrogen pump 100, the compressed hydrogen is generated at the cathode by the voltage applier 102 applying the aforementioned voltage to cause protons taken out from a hydrogen-containing gas that is supplied to the anode to move to the cathode via the electrolyte membrane.

Configuration of Bipolar Plates and Hydrogen Pump Units

Figure 2:
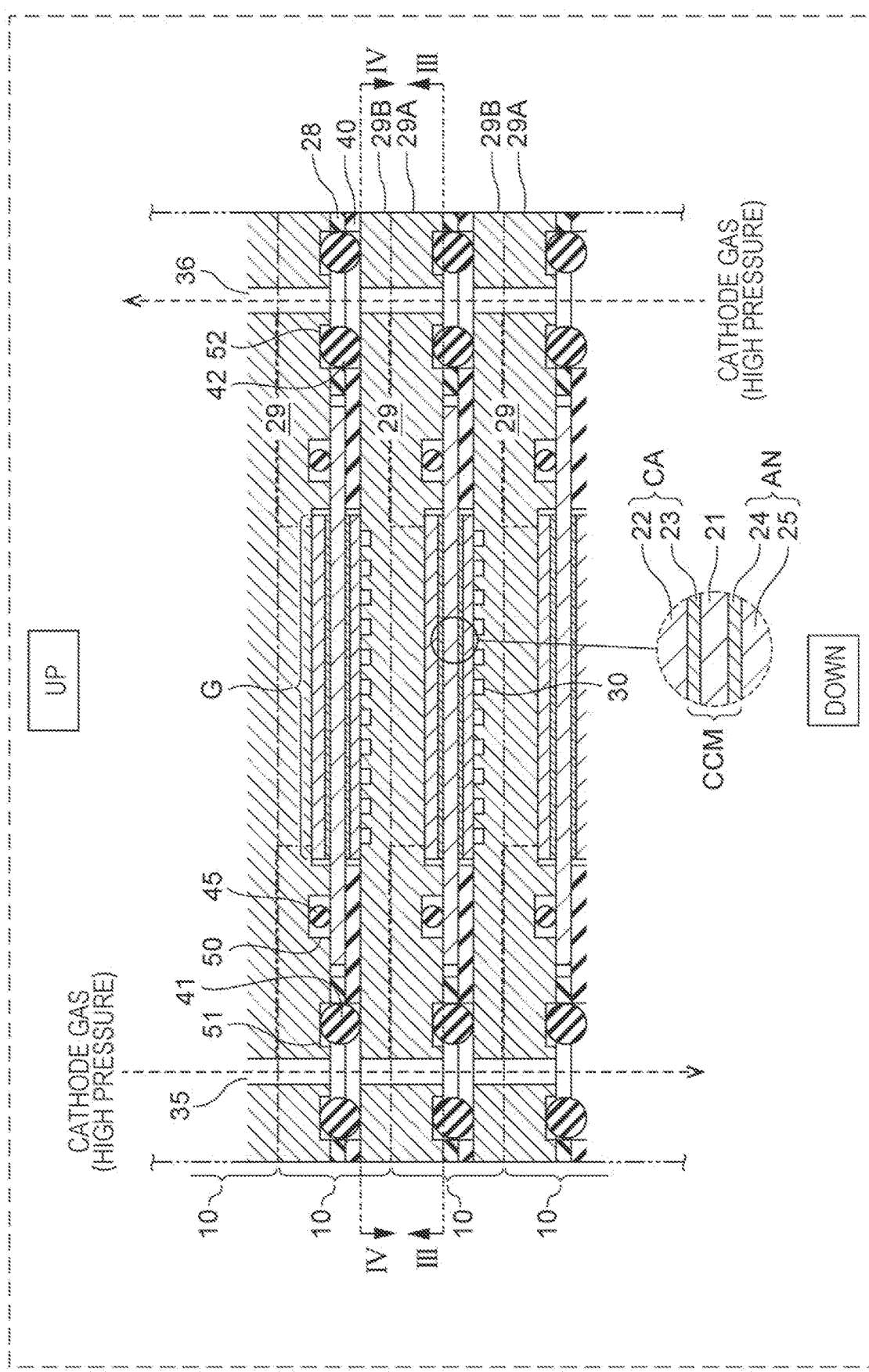
FIG. 2 is a diagram showing examples of bipolar plates and hydrogen pump units of FIG. 1.

FIG. 2 is a diagram showing examples of bipolar plates and hydrogen pump units of FIG. 1.

Figure 3:
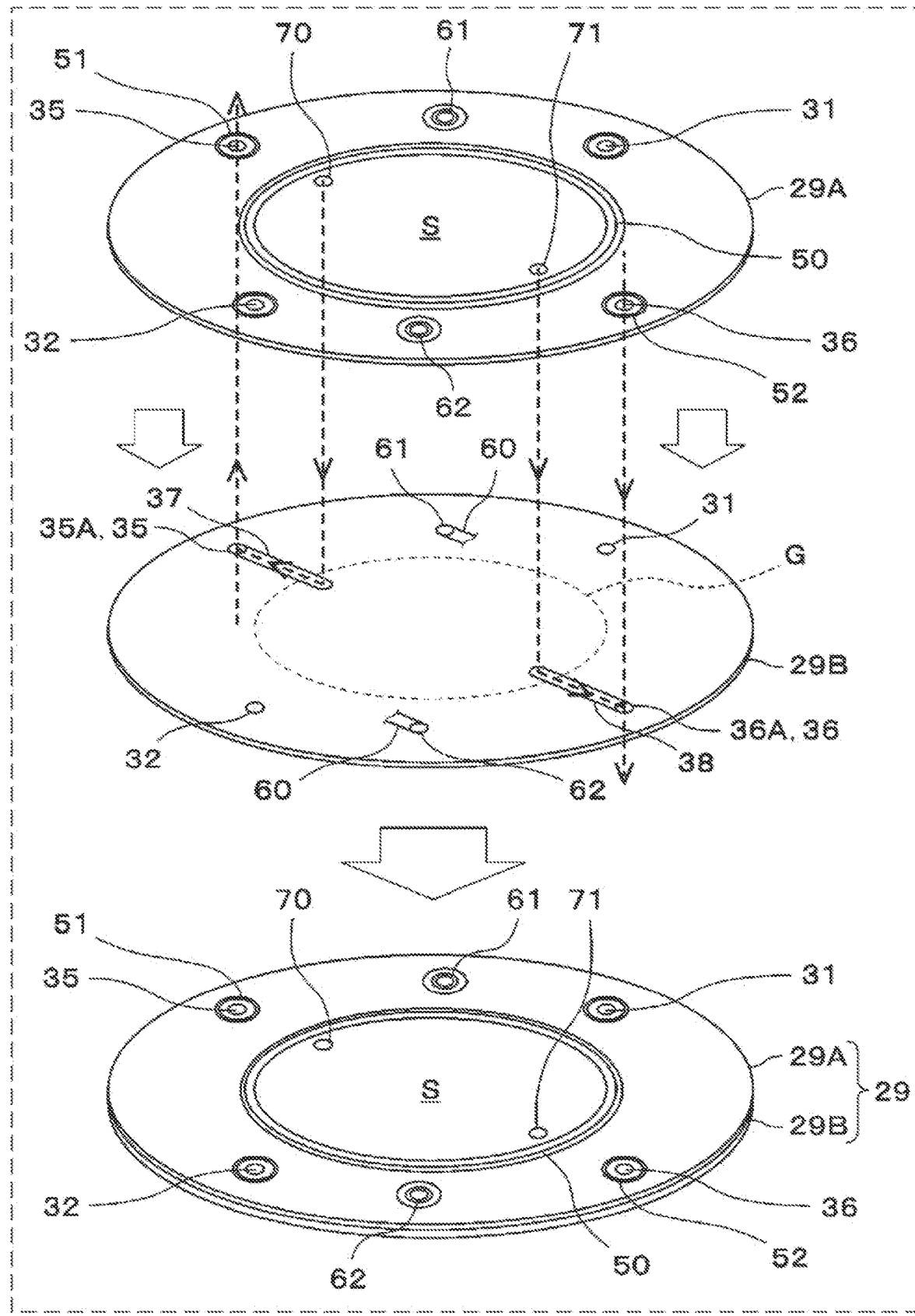
FIG. 3 is an exploded perspective view of a bipolar plate of FIG. 2.

FIG. 3 is an exploded perspective view of a bipolar plate of FIG. 2. Specifically, FIG. 3 illustrates a perspective view of a pair of members constituting a bipolar plate 29 as seen from section III-III of FIG. 2 and a diagram of the members integrated with each other. For convenience of explanation, FIG. 3 omits to illustrate an MEA and an O-ring.

Figure 4:
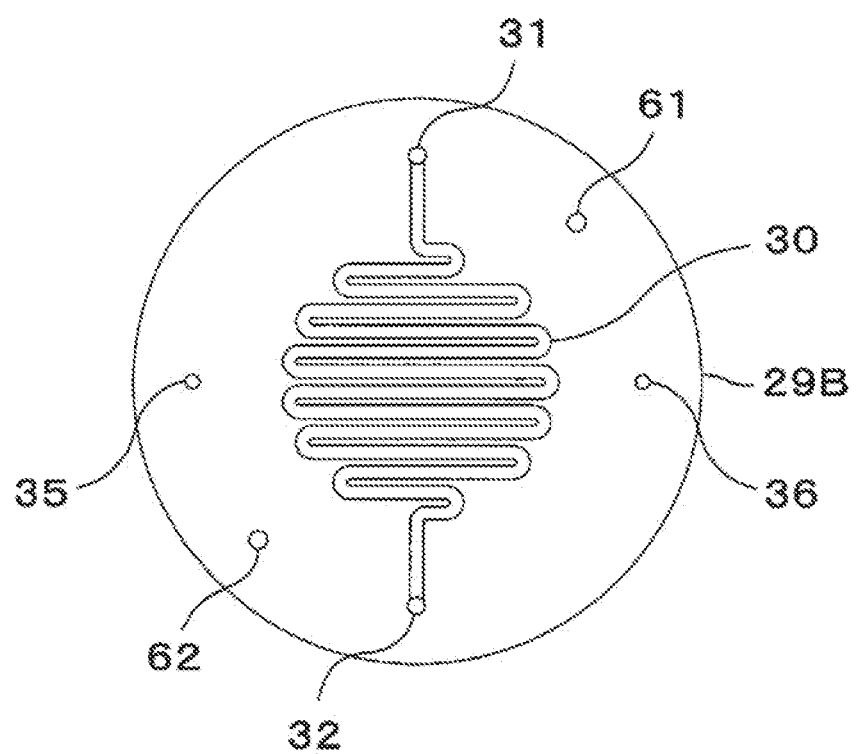
FIG. 4 is a top view of a bipolar plate of FIG. 2.

FIG. 4 is a top view of a bipolar plate of FIG. 2. Specifically, FIG. 4 is a plan view of a member constituting a bipolar plate 29 as seen from section IV-IV of FIG. 2.

As noted above, the bipolar plate 29 includes a plate that functions as an anode separator of one of adjacent hydrogen pump units 10 and a plate that functions as a cathode separator of the other of the adjacent hydrogen pump units 10. In the example shown in FIG. 2, in each of the hydrogen pump units 10, part of an upper bipolar plate 29 constitutes a cathode separator, and part of a lower bipolar plate 29 constitutes an anode separator.

In the following description, the plate that functions as a cathode separator is referred to as "cathode separator 29A", and the plate that functions as an anode separator is referred to as "anode separator 29B".

Note here that as shown in FIG. 3, the cathode separator 29A and anode separator 29B of each of the bipolar plates 29 are integrated with each other by surface joining. For example, the cathode separator 29A and the anode separator 29B can be joined by diffusion joining of a pair of metal plates. According to the Japanese Industrial Standards (JIS), the term "diffusion joining" is defined as a "method by which base metals are brought into close contact with each other, pressurized under temperature conditions equal to or lower than the melting points of the base metals to such an extent that as little plastic deformation as possible takes place, and joined by utilizing diffusion of atoms between joint surfaces".

In the electrochemical hydrogen pump 100 according to the present embodiment, the anode separator 29B has a cooling fluid flow channel 60, provided in a principal surface thereof facing away from the anode AN, through which a cooling fluid flows. Specifically, prior to surface joining of the cathode separator 29A and the anode separator 29B, the anode separator 29B has provided in a joint surface thereof a cooling fluid flow channel 60 through which a cooling fluid for adjusting the temperature of the hydrogen pump unit 10 to an appropriate temperature flows. The cooling fluid flow channel 60 has both of its ends communicating with a cooling fluid lead-in manifold 61 and a cooling fluid lead-out manifold 62, respectively. Possible examples of the cooling fluid include, but are not limited to, cooling water. Although FIG. 2 omits to illustrate the cooling fluid flow channel 60 in an opposite electrode section G of the anode separator 29B, specific examples of the cooling fluid flow channel 60 in such an opposite electrode section G will be described in examples.

As shown in FIG. 2, the hydrogen pump unit 10 includes an electrolyte membrane 21, an anode AN, a cathode CA, a cathode separator 29A, an anode separator 29B, a frame body 28, and a surface seal material 40. Moreover, in the hydrogen pump unit 10, the electrolyte membrane 21, an anode catalyst layer 24, a cathode catalyst layer 23, an anode feeder 25, a cathode feeder 22, the cathode separator 29A, and the anode separator 29B are stacked.

The anode AN is provided on a first principal surface of the electrolyte membrane 21. The anode AN is an electrode including the anode catalyst layer 24 and the anode feeder 25.

The cathode CA is provided on a second principal surface of the electrolyte membrane 21. The cathode CA is an electrode including the cathode catalyst layer 23 and the cathode feeder 22.

In general, the electrochemical hydrogen pump 100 often involves the use of a catalyst-coated membrane CCM obtained by integrally joining the cathode catalyst layer 23 and the anode catalyst layer 24 to the electrolyte membrane 21.

Accordingly, in the electrochemical hydrogen pump 100 according to the present embodiment, the anode feeder 25 and the cathode feeder 22 are provided on the anode catalyst layer 24 and cathode catalyst layer 23, respectively, of the catalyst-coated membrane CCM.

Thus, the electrolyte membrane 21 is sandwiched between the anode AN and the cathode CA.

The electrolyte membrane 21 is a polymer membrane having a proton-conducting property. The electrolyte membrane 21 may be configured in any way as long as it has a proton-conducting property. Possible examples of the electrolyte membrane 21 include, but are not limited to, a fluorinated polymer electrolyte membrane and a hydrocarbon polymer electrolyte membrane. Specifically, usable examples of the electrolyte membrane 21 include Nafion (registered trademark, manufactured by DuPont) and Aciplex (registered trademark, manufactured by Asahi Kasei Corporation).

The anode catalyst layer 24 is provided in contact with the first principal surface of the electrolyte membrane 21. Examples of a catalyst metal that the anode catalyst layer 24 contains include, but are not limited to, platinum.

The cathode catalyst layer 23 is provided in contact with the second principal surface of the electrolyte membrane 21. Examples of a catalyst metal that the cathode catalyst layer 23 contains include, but are not limited to, platinum.

Examples of catalyst carriers of the cathode catalyst layer 23 and the anode catalyst layer 24 include, but are not limited to, carbon particles such as carbon black and black lead and electrically-conductive oxide particles.

In the cathode catalyst layer 23 and the anode catalyst layer 24, fine particles of catalyst metal are highly dispersedly carried by the catalyst carriers. Further, it is common to add a proton-conducting ionomer into the cathode catalyst layer 23 and the anode catalyst layer 24 in order to make a large electrode reaction site.

The cathode feeder 22 is provided on the cathode catalyst layer 23. Further, the cathode feeder 22 is constituted by a porous material, and has electrical conductivity and gas diffusibility. Furthermore, it is desirable that the cathode feeder 22 have such elasticity as to appropriately follow the displacement and deformation of a constituent member that occur due to a differential pressure between the cathode CA and the anode AN during operation of the electrochemical hydrogen pump 100. In the electrochemical hydrogen pump 100 according to the present embodiment, a member made from carbon fibers is used as the cathode feeder 22. For example, a porous carbon fiber sheet such as carbon paper, carbon cloth, or carbon felt may be used. As a base material from which the cathode feeder 22 is made, a carbon fiber sheet may not be used. For example, as a base material from which the cathode feeder 22 is made, a sintered body of metal fibers made of titanium, a titanium alloy, stainless steel, or other metals or a sintered body of metal particles made thereof may be used.

The anode feeder 25 is provided on the anode catalyst layer 24. Further, the anode feeder 25 is constituted by a porous material, and has electrical conductivity and gas diffusibility. Furthermore, it is desirable that the anode feeder 25 be so high in rigidity as to be able to inhibit the displacement and deformation of a constituent member that occur due to a differential pressure between the cathode CA and the anode AN during operation of the electrochemical hydrogen pump 100.

Specifically, usable examples of a base material from which the anode feeder 25 is made include a fiber sintered body, a powder sintered body, an expanded metal, a metal mesh, and a punching metal that are made of titanium, a titanium alloy, stainless steel, carbon, or other materials.

The anode separator 29B is a member stacked on the anode AN. The cathode separator 29A is a member stacked on the cathode CA.

The anode feeder 25 is in contact with a central part of an anode AN side surface of the anode separator 29B that faces the anode AN. Moreover, in the central part, as shown in FIG. 4, an anode gas flow channel 30 having a serpentine shape in plan view through which a hydrogen-containing gas flows is provided. The anode gas flow channel 30 has both of its ends communicating with an anode gas lead-in manifold 31 and an anode gas lead-out manifold 32, respectively.

In a central part of a cathode CA side surface of the cathode separator 29A that faces the cathode CA, a recess is provided, and in this recess, the cathode feeder 22 is accommodated.

That is, the recess is equivalent to a space S (see FIG. 3) in which to store the compressed-hydrogen-containing cathode gas generated at the cathode CA of the hydrogen pump unit 10.

Note here that as shown in FIG. 3, the anode separator 29B is provided with a first cathode gas lead-out manifold 35A through which the cathode gas flows, a second cathode gas lead-out manifold 36A through which the cathode gas flows, and communicating paths 37 and 38 through which to lead, to the first cathode gas lead-out manifold 35A and the second cathode gas lead-out manifold 36A of the anode separator 29B, portions of the cathode gas having flowed in from the cathode CA (space S) of the cathode separator 29A, respectively.

Specifically, the communicating path 37 is constituted by a flow channel groove on the joint surface of the anode separator 29B prior to surface joining of the cathode separator 29A and the anode separator 29B. When seen in plan view, this flow channel groove linearly extends across O-ring grooves 50 and 51 provided in an anode AN side principal surface of the cathode separator 29A. Moreover, the flow channel groove has its first end communicating with the inside of the recess (space S) of the cathode separator 29A via a communicating hole 70 extending up and down near an edge of a bottom surface of the recess. The flow channel groove has its second end connected to the first cathode gas lead-out manifold 35A. The communicating path 37 is appropriately sealed against the entrance of gasses by the cathode separator 29A and the anode separator 29B being integrated with each other by surface joining.

During hydrogen compression operation of the electrochemical hydrogen pump 100, the high-pressure cathode gas generated at the cathode CA is stored in the recess (space S) of the cathode separator 29A, and after that, the cathode gas flows from the space S into the communicating hole 70 and the communicating path 37 in this order as indicated by a dotted arrow in FIG. 3 and is supplied to the first cathode gas lead-out manifold 35A.

The communicating path 38 is constituted by a flow channel groove on the joint surface of the anode separator 29B prior to surface joining of the cathode separator 29A and the anode separator 29B. When seen in plan view, this flow channel groove linearly extends across the O-ring groove 50 and an O-ring groove 52 provided in the cathode separator 29A. Moreover, the flow channel groove has its first end communicating with the inside of the recess (space S) of the cathode separator 29A via a communicating hole 71 extending up and down near the edge of the bottom surface of the recess. The flow channel groove has its second end connected to the second cathode gas lead-out manifold 36A. The communicating path 38 is appropriately sealed against the entrance of gasses by the cathode separator 29A and the anode separator 29B being integrated with each other by surface joining.

During hydrogen compression operation of the electrochemical hydrogen pump 100, the high-pressure cathode gas generated at the cathode CA is stored in the recess (space S) of the cathode separator 29A, and after that, the cathode gas flows from the space S into the communicating hole 71 and the communicating path 38 in this order as indicated by a dotted arrow in FIG. 3 and is supplied to the second cathode gas lead-out manifold 36A.

Although, in the present example, the communicating paths 37 and 38 and the communicating holes 70 and 71 are provided on a straight line connecting the center of the first cathode gas lead-in manifold 35 with the center of the second cathode gas lead-in manifold 36 in plan view, this is not intended to impose any limitation. The communicating paths and the communicating holes may be placed in any places and formed in any shapes as long as they can lead, to the cathode gas lead-in manifolds, portions of the cathode gas having flowed in from the recess (space S) of the cathode separator 29A. Further, the numbers of communicating paths and communicating holes may be 1, or may be equal to or larger than 3.

Although the cathode separator 29A and the anode separator 29B may be constituted, for example, by metal sheets of titanium, stainless steel, gold, or other metals, this is not intended to impose any limitation. For example, a base material from which the cathode separator 29A and the anode separator 29B are made may be constituted by carbon, resin having a metal membrane formed on a surface thereof, or other substances. In a case where the cathode separator 29A and the anode separator 29B are constituted by stainless steel, it is desirable that SUS316L be used as a material of which the cathode separator 29A and the anode separator 29B are made. This is because SUS316L is superior in properties such as acid resistance and hydrogen brittleness resistance among various types of stainless steel.

By the MEA thus being sandwiched between the cathode separator 29A and the anode separator 29B, the hydrogen pump unit 10 is formed.

As shown in FIGS. 2 and 3, the cathode separator 29A has the O-ring groove 50, provided on a cathode CA side principal surface thereof, which surrounds a region on the principal surface that faces the cathode CA, and the O-ring 45 is retained in the O-ring groove 50.

Further, the O-ring groove 50 faces a region on a cathode CA side principal surface of the electrolyte membrane 21 in which the cathode CA is not provided. In the example shown in FIG. 2, the electrolyte membrane 21 is provided with a great width to extend across a side wall of the recess in which the cathode CA is accommodated, and the O-ring 45 is provided in contact with a wide portion of the electrolyte membrane 21. Usable examples of the O-ring 45 (the same applies to other O-rings) include, but are not limited to, an O-ring of fluorocarbon rubber from the point of view of acid resistance and hydrogen brittleness resistance.

The frame body 28 is a member provided around the outer periphery of the electrolyte membrane 21. Possible examples of a base material from which the frame body 28 is made include, but are not limited to, fluorocarbon rubber from the point of view of acid resistance and hydrogen brittleness resistance. The insulative frame body 28 makes it possible to appropriately configure the hydrogen pump unit 10 such that it is hard for the cathode separator 29A and the anode separator 29B to become short-circuited with each other.

The surface seal material 40 is provided on the outer periphery of a region on the anode AN side principal surface of the anode separator 29B that faces the anode AN. Further, the surface seal material 40 faces a region on an anode AN side principal surface of the electrolyte membrane 21 in which the anode AN is not provided and an anode AN side principal surface of the frame body 28. In the example shown in FIG. 2, the electrolyte membrane 21 is provided with a great width to extend across an outer peripheral end of the anode AN, and a wide portion of the electrolyte membrane 21 and the principal surface of the frame body 28 are in contact with a principal surface of the surface seal material 40. Possible examples of a base material from which the surface seal material 40 is made include, but are not limited to, fluorocarbon rubber and fluororesin from the point of view of acid resistance and hydrogen brittleness resistance. The insulative surface seal material 40 makes it possible to appropriately configure the hydrogen pump unit 10 such that it is hard for the cathode separator 29A and the anode separator 29B to become short-circuited with each other.

Although, in the electrochemical hydrogen pump 100 according to the present embodiment, the electrolyte membrane 21 and the frame body 28 are separately constructed, they may be integrated with each other. Further, such a frame 28 may not be provided. For example, even without the frame body 28, the surface seal material 40 makes it possible to configure the hydrogen pump unit 10 such that it is hard for the cathode separator 29A and the anode separator 29B to become short-circuited with each other.

As shown in FIG. 2, the cathode separator 29A is provided with the O-ring groove 51, which surrounds the first cathode gas lead-out manifold 35. Moreover, an O-ring 41 is retained in the O-ring groove 51. The cathode separator 29A is provided with the O-ring groove 52, which surrounds the second cathode gas lead-out manifold 36. Moreover, an O-ring 42 is retained in the O-ring groove 52.

Note here that in the electrochemical hydrogen pump 100 according to the present embodiment, the O-ring 41 and the O-ring 42 are each in contact with the anode AN side principal surface of the anode separator 29B. That is, the O-ring 41 and the O-ring 42 are each in contact with both a cathode separator 29A and an anode separator 29B corresponding to the bipolar plates 29 on both sides. Moreover, the surface seal material 40 is not provided on a region on the anode AN side principal surface of the anode separator 29B with which the O-ring 41 and the O-ring 42 are in contact. Further, the frame body 28 is not provided in a region in which the O-ring 41 and the O-ring 42 are disposed.

Specifically, the frame body 28 has a pair of through-holes (circular openings) formed therein so that the respective outer shapes of the through-holes are identical to the respective outer shapes of the O-ring grooves 51 and 52. Further, the surface seal material 40 has a pair of through-holes (circular openings) formed therein so that the respective outer shapes of the through-holes are identical to the respective outer shapes of the O-ring grooves 51 and 52. Moreover, a columnar space constituted by through-holes provided in the frame body 28 and the surface seal material 40 accommodates the O-ring 41, and an inner part of the O-ring 41 provided in the columnar shape constitutes part of the first cathode gas lead-out manifold 35. Further, a columnar space constituted by through-holes provided in the frame body 28 and the surface seal material 40 accommodates the O-ring 42, and an inner part of the O-ring 42 provided in the columnar shape constitutes part of the second cathode gas lead-out manifold 36.

As noted above, the electrochemical hydrogen pump 100 according to the present embodiment makes it possible to more appropriately place a cooling fluid flow channel 60 through which a cooling fluid for keeping a hydrogen pump unit 10 at an appropriate temperature flows than has conventionally been the case.

Specifically, by having the cooling fluid flow channel 60 in the principal surface of the anode separator 29B facing away from the anode AN, the electrochemical hydrogen pump 100 according to the present embodiment makes it unnecessary to place a dedicated plate provided with such a cooling fluid flow channel. Therefore, the electrochemical hydrogen pump 100 according to the present embodiment can make apparatus costs lower than in a case where such a dedicated plate is placed.

Further, if the aforementioned cooling fluid flow channel is provided in a principal surface of the cathode separator 29A facing away from the cathode CA, there is a need to provide the cathode separator 29A with a recess for use as the cooling fluid flow channel; however, in a region in which this recess is provided, the cathode separator 29A has a decreased thickness. Meanwhile, since a principal surface of the cathode separator 29A facing toward the cathode CA is exposed to the high-pressure compressed hydrogen, there is a need to increase the rigidity of the cathode separator 29A in the aforementioned region. For example, although it is possible to increase the rigidity in the aforementioned region by increasing the overall thickness of the cathode separator 29A, this may invite increases in size and cost of the apparatus.

On the other hand, a principal surface of the anode separator 29B facing toward the anode AN is only exposed to a low-pressure hydrogen-containing gas. Therefore, by having the cooling fluid flow channel 60 provided in the principal surface of the anode separator 29B facing away from the anode AN, the electrochemical hydrogen pump 100 according to the present embodiment can alleviate the foregoing inconvenience.

Further, the electrochemical hydrogen pump 100 according to the present embodiment can appropriately supply the high-pressure cathode gas to the first and second cathode gas lead-out manifolds 35A and 36A of the anode separator 29B from the cathode CA (space S) above the cathode separator 29A through the communicating paths 37 and 38 of the anode separator 29B, respectively.

First Example

Figure 5:
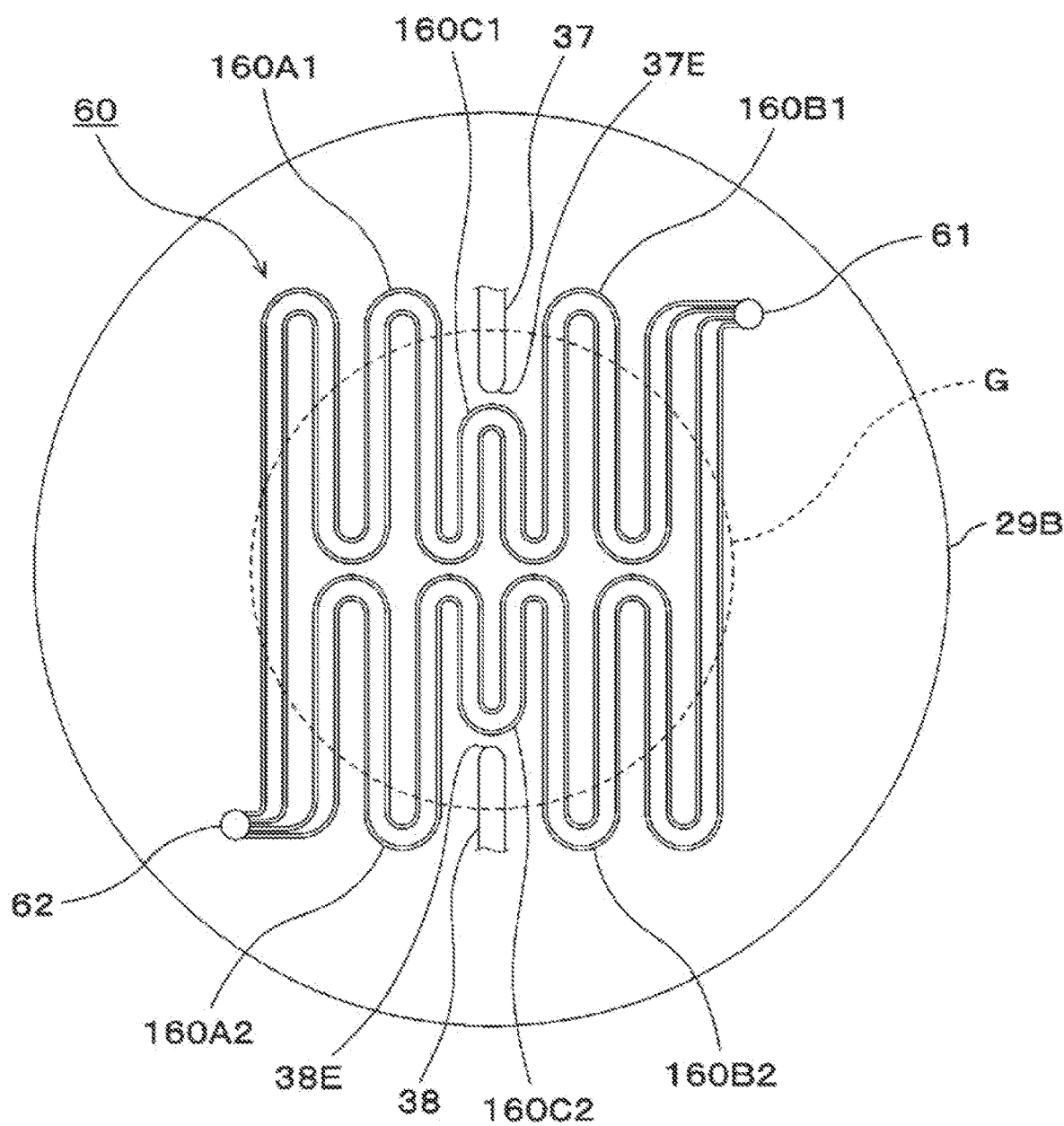
FIG. 5 is a diagram showing an example of a cooling fluid flow channel provided in an anode separator of an electrochemical hydrogen pump according to a first example of the embodiment.

FIG. 5 is a diagram showing an example of a cooling fluid flow channel provided in an anode separator of an electrochemical hydrogen pump according to a first example of the embodiment. Specifically, FIG. 5 is a plan view of the joint surface of the anode separator 29B prior to surface joining of the cathode separator 29A and the anode separator 29B. For convenience of explanation, FIG. 5 omits to illustrate manifolds other than the cooling fluid lead-in manifold 61 and the cooling fluid lead-out manifold 62.

As shown in FIG. 5, the cooling fluid flow channel 60 is configured to surround part of the communicating path 37 including an upstream end 37E of the communicating path 37 (hereinafter referred to as "part of the communicating path 37") and part of the communicating path 38 including an upstream end 38E of the communicating path 38 (hereinafter referred to as "part of the communicating path 38"). This is for the following reason.

As shown in FIG. 3, the upstream end 37E of the communicating path 37 and the upstream end 38E of the communicating path 38 both correspond to portions into which the high-pressure cathode gas flows from the cathode CA (space S) above the cathode separator 29A via the cathode separator 29A. Therefore, as shown in FIG. 5, the communicating paths 37 and 38 extend into the opposite electrode section G of the anode separator 29B. That is, the respective upstream ends 37E and 38E of the communicating paths 37 and 38 are each present in the opposite electrode section G of the anode separator 29B.

Note here that although it is desirable to uniformly place the cooling fluid flow channel 60 in the opposite electrode section G of the anode separator 29B in order to reduce the occurrence of unevenness in temperature within the MEA due to the cooling fluid, it is necessary that the communicating paths 37 and 38 and the cooling fluid flow channel 60 not interfere with each other. In particular, since the high-pressure cathode gas flows through the communicating paths 37 and 38, it is desirable to lay the communicating paths 37 and 38 and the cooling fluid flow channel 60 so that they are not too close to each other.

For this reason, if, in the anode separator 29B, the cooling fluid flow channel 60 is not provided in such a way as to surround part of the communicating path 37, there is a possibility of occurrence of unevenness in temperature in a portion of the MEA situated close to the part of the communicating path 37. Further, if the cooling fluid flow channel 60 is not provided in such a way as to surround part of the communicating path 38, there is a possibility of occurrence of unevenness in temperature in a portion of the MEA situated close to the part of the communicating path 38. This may cause a decrease in efficiency of hydrogen compression operation of the electrochemical hydrogen pump 100.

To address this problem, the electrochemical hydrogen pump 100 according to the present example is configured such that in the anode separator 29B, the cooling fluid flow channel 60 is placed in such a way as to surround part of the communicating path 37 and part of the communicating path 38. This allows the electrochemical hydrogen pump 100 according to the present example to further reduce the occurrence of unevenness in temperature within the MEA than in a case where the cooling fluid flow channel 60 does not surround part of the communicating path 37 or part of the communicating path 38.

In the electrochemical hydrogen pump 100 according to the present example, as shown in FIG. 5, the cooling fluid flow channel 60 has two serpentine flow channels provided beside the communicating path 37 and, with these serpentine flow channels each including two shuttling paths 160A1 and 160B1 and one shuttling path 160C1 which is located between the two shuttling paths 160A1 and 160B1, an amplitude of each of the two shuttling paths 160A1 and 160B1 is greater than an amplitude of the one shuttling path 160C1, and the part of the communicating path 37 is surrounded by the shuttling paths 160A1 and 160B1 and the one shuttling path 160C1.

In the example shown in FIG. 5, the shuttling paths 160A1 and 160B1 have their respective linear portions extending parallel to a direction of extension of the communicating path 37 at both ends, respectively, of the communicating path 37, and the one shuttling path 160C1, which is connected to each of the shuttling path 160A1 and 160B1, turns near the upstream end 37E of the communicating path 37.

Further, the cooling fluid flow channel 60 has two serpentine flow channels provided beside the communicating path 38 and, with these serpentine flow channels each including two shuttling paths 160A2 and 160B2 and one shuttling path 160C2 which is located between the two shuttling paths 160A2 and 160B2, an amplitude of each of the two shuttling paths 160A2 and 160B2 is greater than an amplitude of the one shuttling path 160C2, and the part of the communicating path 38 including the upstream end 38E of the communicating path 38 is surrounded by the shuttling paths 160A2 and 160B2 and the one shuttling path 160C2.

In the example shown in FIG. 5, the shuttling paths 160A2 and 160B2 have their respective linear portions extending parallel to a direction of extension of the communicating path 38 at both ends, respectively, of the communicating path 38, and the one shuttling path 160C2, which is connected to each of the shuttling path 160A2 and 160B2, turns near the upstream end 38E of the communicating path 38.

Thus, by being configured such that with a serpentine flow channel including two shuttling paths 160A1 and 160B1 and one shuttling path 160C1 which is located between the two shuttling paths 160A1 and 160B1, an amplitude of each of the two shuttling paths 160A1 and 160B1 is greater than an amplitude of the one shuttling path 160C1, and the part of the communicating path 37 is surrounded by the shuttling paths 160A1 and 160B1 and the one shuttling path 160C1 and that with a serpentine flow channel including two shuttling paths 160A2 and 160B2 and one shuttling path 160C2 which is located between the two shuttling paths 160A2 and 160B2, an amplitude of each of the two shuttling paths 160A2 and 160B2 is greater than an amplitude of the one shuttling path 160C2, and the part of the communicating path 38 is surrounded by the shuttling paths 160A2 and 160B2 and the one shuttling path 160C2, the electrochemical hydrogen pump 100 according to the present example can further reduce the occurrence of unevenness in temperature within the MEA than in a case where the serpentine flow channels do not surround the aforementioned parts.

It should be noted that the foregoing serpentine flow channels are just a few examples and are not limited to the present example. For example, although FIG. 5 shows four serpentine flow channels, the number of serpentine flow channels can be set at an appropriate value according to conditions for temperature control of the MEA or other conditions.

The electrochemical hydrogen pump 100 according to the present example may be the same as the electrochemical hydrogen pump 100 according to the embodiment except for the aforementioned features.

Second Example

Figure 6:
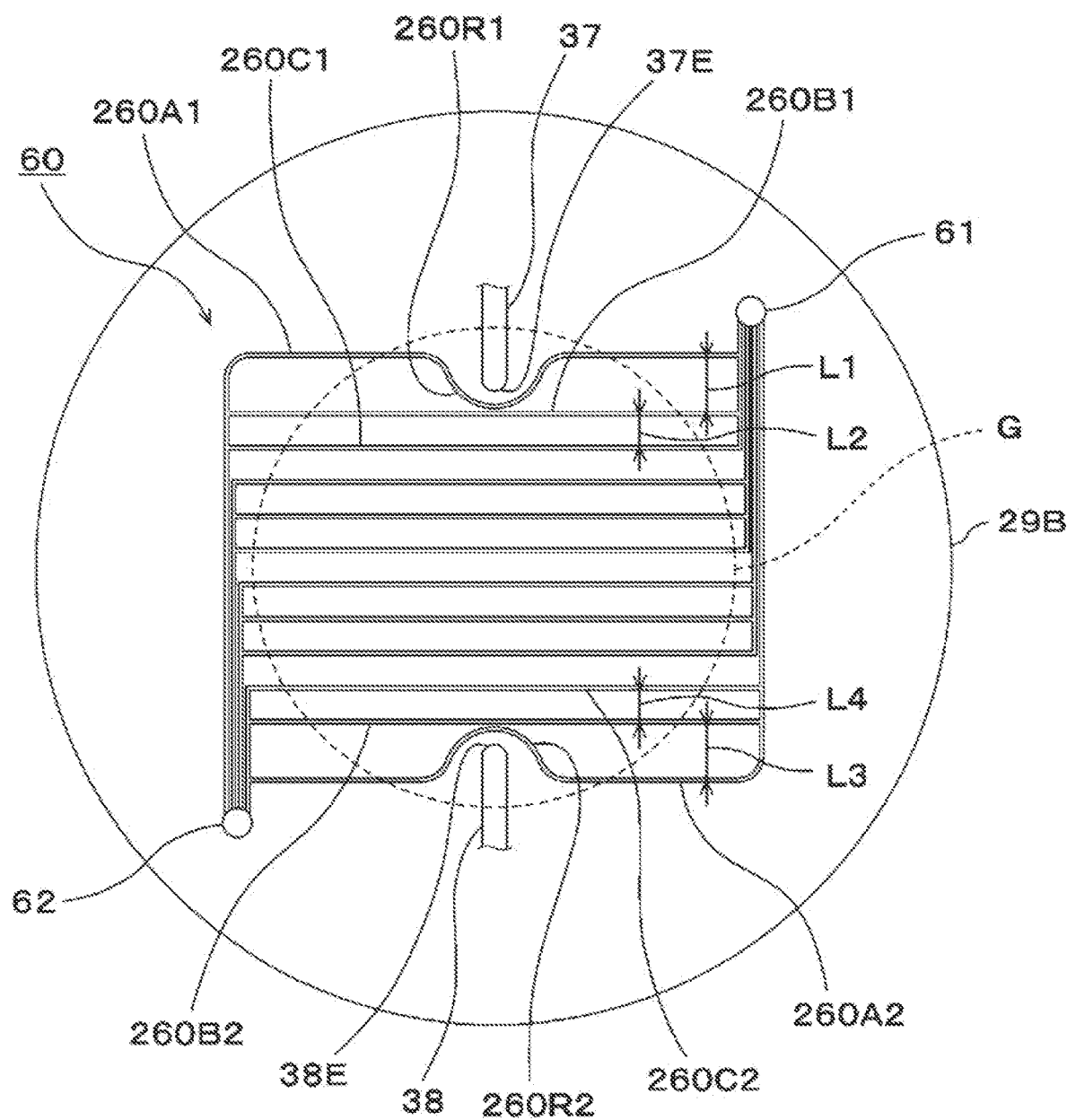
FIG. 6 is a diagram showing an example of a cooling fluid flow channel provided in an anode separator of an electrochemical hydrogen pump according to a second example of the embodiment.

FIG. 6 is a diagram showing an example of a cooling fluid flow channel provided in an anode separator of an electrochemical hydrogen pump according to a second example of the embodiment. Specifically, FIG. 6 is a plan view of the joint surface of the anode separator 29B prior to surface joining of the cathode separator 29A and the anode separator 29B. For convenience of explanation, FIG. 6 omits to illustrate manifolds other than the cooling fluid lead-in manifold 61 and the cooling fluid lead-out manifold 62.

As shown in FIG. 6, the cooling fluid flow channel 60 has twelve linear flow channels and, with these linear flow channels including a linear flow channel 260A1 situated closest to the communicating path 37 and provided with a bypass 260R1 that bypasses part of the communicating path 37, is configured such that the part of the communicating path 37 is surrounded by the bypass 260R1. Further, with these linear flow channels including a linear flow channel 260A2 situated closest to the communicating path 38 and provided with a bypass 260R2 that bypasses part of the communicating path 38, the cooling fluid flow channel 60 is configured such that the part of the communicating path 38 is surrounded by the bypass 260R2.

In the example shown in FIG. 6, the linear flow channels 260A1 and 260A2 extend in such directions as to intersect perpendicularly with the communicating paths 37 and 38, respectively, and the bypasses 260R1 and 260R2, which are connected to the linear flow channels 260A1 and 260A2, respectively, turn near the upstream ends 37E and 38E of the communicating paths 37 and 38, respectively.

Furthermore, in the electrochemical hydrogen pump 100 according to the present example, as shown in FIG. 6, a pitch L1 between the linear flow channel 260A1 and a linear flow channel 260B1 adjacent internally to the linear flow channel 260A1 is greater than a pitch L2 between the linear flow channel 260B1 and a linear flow channel 260C1 adjacent internally to the linear flow channel 260B1. Further, a pitch L3 between the linear flow channel 260A2 and a linear flow channel 260B2 adjacent internally to the linear flow channel 260A2 is greater than a pitch L4 between the linear flow channel 260B2 and a linear flow channel 260C2 adjacent internally to the linear flow channel 260B2.

Thus, by being configured such that the bypasses 260R1 and 260R2 surround parts of the communicating paths 37 and 38, respectively, the electrochemical hydrogen pump 100 according to the present example can further reduce the occurrence of unevenness in temperature within the MEA than in a case where the bypasses 260R1 and 260R2 do not surround the aforementioned parts. It should be noted that a description of the details of the working effects that are brought about by the present configuration is omitted, as they are the same as the details of the working effects that are brought about by the electrochemical hydrogen pump 100 according to the first example.

Further, the electrochemical hydrogen pump 100 according to the present example can cool a wider region than in a case where flow channels are placed at equal pitches, and can therefore further reduce the occurrence of unevenness in temperature within the MEA.

Further, according to a numerical simulation, it was found that laying the cooling fluid flow channel 60 using linear flow channels and bypasses as shown in FIG. 6 makes a pressure loss in the cooling fluid flow channel 60 lower than in a case where the cooling fluid flow channel 60 is laid using serpentine flow channels as shown in FIG. 5.

Therefore, the electrochemical hydrogen pump 100 according to the present example can reduce a pressure loss in the cooling fluid flow channel 60 while reducing the occurrence of unevenness in temperature within the MEA. This makes it possible to bring about further improvement in efficiency of hydrogen compression operation of the hydrogen pump unit 10.

It should be noted that the foregoing linear flow channels bypasses are just a few examples and are not limited to the present example. For example, although FIG. 6 shows twelve linear flow channels, the number of linear flow channels can be set at an appropriate value according to conditions for temperature control of the MEA or other conditions.

The electrochemical hydrogen pump 100 according to the present example may be the same as the electrochemical hydrogen pump 100 according to the embodiment except for the aforementioned features.

Third Example

Figure 7:
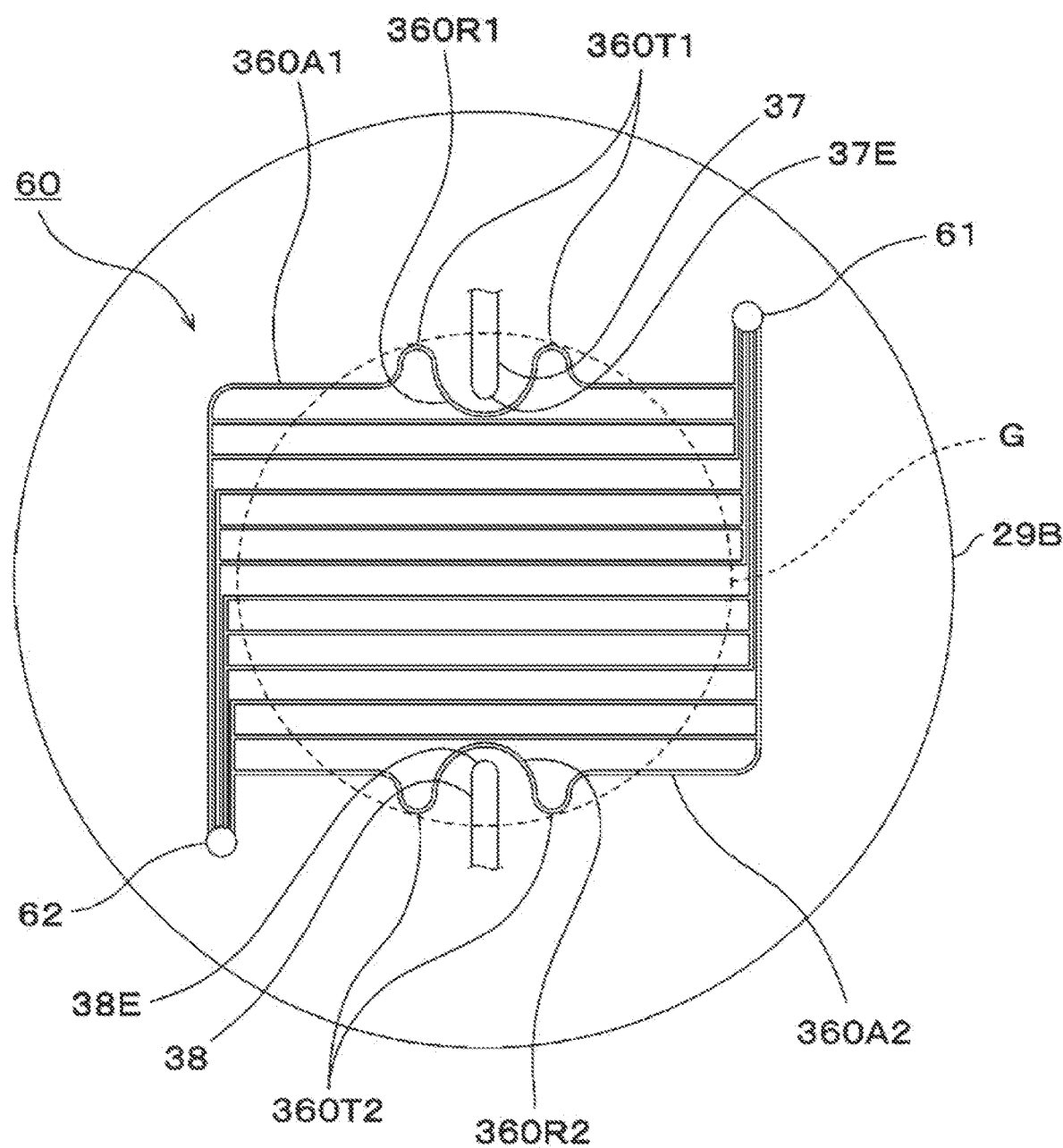
FIG. 7 is a diagram showing an example of a cooling fluid flow channel provided in an anode separator of an electrochemical hydrogen pump according to a third example of the embodiment.

FIG. 7 is a diagram showing an example of a cooling fluid flow channel provided in an anode separator of an electrochemical hydrogen pump according to a third example of the embodiment. Specifically, FIG. 7 is a plan view of the joint surface of the anode separator 29B prior to surface joining of the cathode separator 29A and the anode separator 29B. For convenience of explanation, FIG. 7 omits to illustrate manifolds other than the cooling fluid lead-in manifold 61 and the cooling fluid lead-out manifold 62.

As shown in FIG. 7, the cooling fluid flow channel 60 has twelve linear flow channels and, with these linear flow channels including a linear flow channel 360A1 situated closest to the communicating path 37 and provided with a bypass 360R1 that bypasses part of the communicating path 37, is configured such that the part of the communicating path 37 is surrounded by the bypass 360R1. Further, with these linear flow channels including a linear flow channel 360A2 situated closest to the communicating path 38 and provided with a bypass 360R2 that bypasses part of the communicating path 38, the cooling fluid flow channel 60 is configured such that the part of the communicating path 38 is surrounded by the bypass 360R2.

In the example shown in FIG. 7, the linear flow channels 360A1 and 360A2 extend in such directions as to intersect perpendicularly with the communicating paths 37 and 38, respectively, and the bypasses 360R1 and 360R2, which are connected to the linear flow channels 360A1 and 360A2, respectively, turn near the upstream ends 37E and 38E of the communicating paths 37 and 38, respectively.

Furthermore, in the electrochemical hydrogen pump 100 according to the present example, as shown in FIG. 7, each of the bypasses 360R1 and 360R2 has upstream and downstream ends having convex shapes curved outward. Specifically, the upstream and downstream ends of the bypass 360R1 each include a convex portion 360T1 projecting outward along the direction of extension of the communicating path 37. The upstream and downstream ends of the bypass 360R2 each include a convex portion 360T2 projecting outward along the direction of extension of the communicating path 38. In the example shown in FIG. 7, adjacent ones of the twelve linear flow channels that are placed at pitches have all been placed at the same distance from each other.

Thus, by being configured such that the bypasses 360R1 and 360R2 surround parts of the communicating paths 37 and 38, respectively, the electrochemical hydrogen pump 100 according to the present example can further reduce the occurrence of unevenness in temperature within the MEA than in a case where the bypasses 360R1 and 360R2 do not surround the aforementioned parts. It should be noted that a description of the details of the working effects that are brought about by the present configuration is omitted, as they are the same as the details of the working effects that are brought about by the electrochemical hydrogen pump 100 according to the first example.

Further, the electrochemical hydrogen pump 100 according to the present example can further reduce the occurrence of unevenness in temperature within the MEA in case where the upstream and downstream ends of each of the bypasses 360R1 and 360R2 do not have convex shapes curved outward.

Further, according to a numerical simulation, it was found that laying the cooling fluid flow channel 60 using linear flow channels and bypasses as shown in FIG. 7 makes a pressure loss in the cooling fluid flow channel 60 lower than in a case where the cooling fluid flow channel 60 is laid using serpentine flow channels as shown in FIG. 5.

Therefore, the electrochemical hydrogen pump 100 according to the present example can reduce a pressure loss in the cooling fluid flow channel 60 while reducing the occurrence of unevenness in temperature within the MEA. This makes it possible to bring about further improvement in efficiency of hydrogen compression operation of the hydrogen pump unit 10.

It should be noted that the foregoing linear flow channels and bypasses are just a few examples and are not limited to the present example. For example, although FIG. 7 shows twelve linear flow channels, the number of linear flow channels can be set at an appropriate value according to conditions for temperature control of the MEA or other conditions.

The electrochemical hydrogen pump 100 according to the present example may be the same as the electrochemical hydrogen pump 100 according to the embodiment except for the aforementioned features.

Fourth Example

The electrochemical hydrogen pump 100 according to the present example is the same as the electrochemical hydrogen pump 100 according to the embodiment except that in the anode separator 29B, the cooling fluid flow channel 60 and the anode gas flow channel 30 are equal in flow channel width and flow channel depth to each other.

Thus, by being configured such that the cooling fluid flow channel 60 and the anode gas flow channel 30 are set to be equal in flow channel width and flow channel depth to each other, the electrochemical hydrogen pump 100 according to the present example makes it possible to reduce the manufacturing cost of the anode separator 29B.

For example, the cooling fluid flow channel 60 and the anode gas flow channel 30 can be made in the two principal surfaces, respectively, of the anode separator 29B under the same processing conditions using the same processing apparatus. For example, in a case where the cooling fluid flow channel 60 and the anode gas flow channel 30 are formed by an etching method, the two principal surfaces of the anode separator 29B can be processed under the same etching conditions in a single etching apparatus if the cooling fluid flow channel 60 and the anode gas flow channel 30 have identical shapes.

The electrochemical hydrogen pump 100 according to the present example may be the same as the electrochemical hydrogen pump 100 according to any of the embodiment and the first to third examples of the embodiment except for the aforementioned features.

Modification

Figure 8:
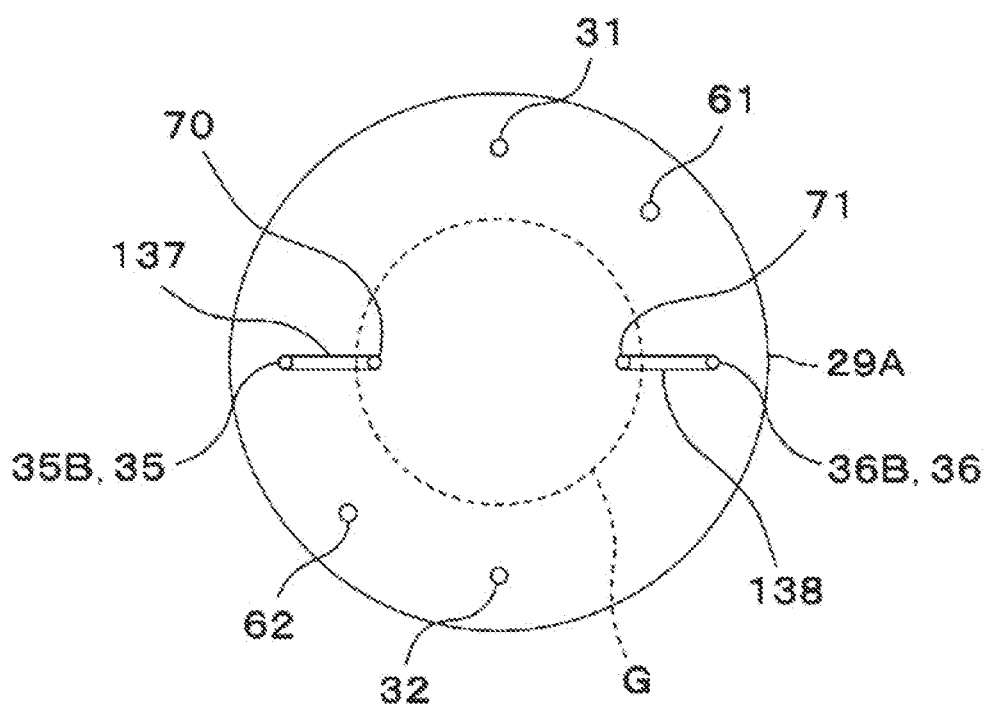
FIG. 8 is a diagram showing examples of communicating paths provided in a cathode separator of an electrochemical hydrogen pump according to a modification of the embodiment.

FIG. 8 is a diagram showing examples of communicating paths provided in a cathode separator of an electrochemical hydrogen pump according to a modification of the embodiment.

As shown in FIG. 8, the cathode separator 29A is provided with a first cathode gas lead-out manifold 35B through which the cathode gas flows, a second cathode gas lead-out manifold 36B through which the cathode gas flows, and communicating paths 137 and 138 through which to lead, to the first cathode gas lead-out manifold 35B and second cathode gas lead-out manifold 36B of the cathode separator 29A, portions of the cathode gas having flowed in from the cathode CA (space S) of the cathode separator 29A, respectively.

That is, the communicating paths 137 and 138 are constituted by flow channel grooves on a joint surface of the cathode separator 29A (i.e. a principal surface of the cathode separator 29A facing away from the cathode CA) prior to surface joining of the cathode separator 29A and the anode separator 29B. It should be noted that a detailed configuration of such flow channel grooves is omitted, as it can be easily understood by referring to the description of the embodiment.

Further, in the electrochemical hydrogen pump 100 according to the present modification, the principal surface of the anode separator 29B facing away from the anode AN has regions facing the communicating paths 137 and 138, and the cooling fluid flow channel 60 (see FIG. 3) is configured to surround parts of the regions including ends facing upstream ends of the communicating paths 137 and 138 (hereinafter referred to as "parts of the regions facing the upstream ends of the communicating paths 137 and 138").

This allows the electrochemical hydrogen pump 100 according to the present modification to further reduce the occurrence of unevenness in temperature within the MEA than in a case where the cooling fluid flow channel 60 does not surround parts of the regions including the ends facing the upstream ends of the communicating paths 137 and 138. It should be noted that a detailed configuration of the cooling fluid flow channel 60 in the opposite electrode section G of the anode separator 29B and the working effects that are brought about by the present configuration are omitted, as they can be easily understood by referring to the first to third examples of the embodiment.

The electrochemical hydrogen pump 100 according to the present modification may be the same as the electrochemical hydrogen pump 100 according to any of the embodiment and the first to fourth examples of the embodiment except for the aforementioned features.

The embodiment, the first to fourth examples of the embodiment, and the modification of the embodiment may be combined with each other unless they mutually exclude each other.

Further, it is obvious to persons skilled in the art from the above description that there are many improvements to the present disclosure and other embodiments of the present disclosure. Accordingly, the above description should be interpreted as illustrative, and is provided for the purpose of teaching persons skilled in the art the best mode of carrying out the present disclosure. The details of a structure and/or a function of the present disclosure can be substantially changed without departing from the spirit of the present disclosure.

For example, the flow channel structure of an electrochemical hydrogen pump 100 is also applicable to another compression apparatus such as a water electrolysis apparatus.

An aspect of the present disclosure is applicable to a compression apparatus that makes it possible to more appropriately place a flow channel through which a cooling fluid for keeping a compression unit at an appropriate temperature flows than has conventionally been the case.

What is claimed is:

1. A compression apparatus comprising:
an electrolyte membrane;
an anode provided on a first principal surface of the electrolyte membrane;
a cathode provided on a second principal surface of the electrolyte membrane;
an anode separator provided on the anode and having a first principal surface facing toward the anode and a second principal surface opposite to the first principal surface and facing away from the anode;
a cathode separator provided on the cathode; and
a voltage applier that applies a voltage between the anode and the cathode, wherein;
the compression apparatus causes, by applying the voltage using the voltage applier, protons taken out from a hydrogen-containing gas that is supplied to the anode to move to the cathode via the electrolyte membrane and produces compressed hydrogen,
the anode includes an anode catalyst layer contacting the electrolyte membrane and an anode feeder contacting the anode separator and made of a gas diffusive material, and
the anode separator has a first flow channel, provided in the second principal surface, through which a cooling fluid flows.

2. The compression apparatus according to claim 1, wherein the anode separator has a first manifold through which a cathode gas containing the compressed hydrogen flows and a first communicating path, provided in the second principal surface, that leads the cathode gas to the first manifold.

3. The compression apparatus according to claim 1, wherein the cathode separator has a principal surface facing away from the cathode and a second manifold through which a cathode gas containing the compressed hydrogen flows and a second communicating path, provided in the principal surface of the cathode separator, that leads the cathode gas to the second manifold.

4. The compression apparatus according to claim 2, wherein the first flow channel is configured to surround part of the first communicating path, the part including an upstream end of the first communicating path.

5. The compression apparatus according to claim 3, wherein
the second principal surface of the anode separator has a region facing the second communicating path, and
the first flow channel is configured to surround part of the region, the part including an end facing an upstream end of the second communicating path.

6. The compression apparatus according to claim 4, wherein the first flow channel has a serpentine flow channel including two shuttling paths and one shuttling path which is located between the two shuttling paths, an amplitude of each of the two shuttling paths is greater than an amplitude of the one shuttling path, and the part is surrounded by the two shuttling paths and the one shuttling path.

7. The compression apparatus according to claim 4, wherein the first flow channel has a first linear flow channel provided with a bypass that bypasses the part, and is configured such that the part is surrounded by the bypass.

8. The compression apparatus according to claim 7, wherein a pitch between the first linear flow channel and a second linear flow channel adjacent internally to the first linear flow channel is greater than a pitch between the second linear flow channel and a third linear flow channel adjacent internally to the second linear flow channel.

9. The compression apparatus according to claim 7, wherein the bypass has upstream and downstream ends having convex shapes curved outward.

10. The compression apparatus according to claim 1, wherein
the anode separator has a second flow channel, provided in the first principal surface, through which the hydrogen-containing gas flows, and
the first flow channel and the second flow channel are equal in flow channel width and flow channel depth to each other.

11. The compression apparatus according to claim 1, wherein the cooling fluid is water.

12. A compression apparatus comprising:
an electrolyte membrane;
an anode provided on a first principal surface of the electrolyte membrane;
a cathode provided on a second principal surface of the electrolyte membrane;
an anode separator provided on the anode and having a first principal surface facing toward the anode and a second principal surface opposite to the first principal surface and facing away from the anode;
a cathode separator provided on the cathode; and
a voltage applier that applies a voltage between the anode and the cathode, wherein:
the compression apparatus causes, by applying the voltage using the voltage applier, protons taken out from a hydrogen-containing gas that is supplied to the anode to move to the cathode via the electrolyte membrane and produces compressed hydrogen,
the anode separator has a first flow channel, provided in the second principal surface, through which a cooling fluid flows,
the anode separator has a first manifold through which a cathode gas containing the compressed hydrogen flows and a first communicating path, provided in the second principal surface, that leads the cathode gas to the first manifold, and
the first flow channel is configured to surround part of the first communicating path, the part including an upstream end of the first communicating path.

13. A compression apparatus comprising:

an electrolyte membrane;

an anode provided on a first principal surface of the electrolyte membrane;

a cathode provided on a second principal surface of the electrolyte membrane;

an anode separator provided on the anode and having a first principal surface facing toward the anode and a second principal surface opposite to the first principal surface and facing away from the anode;

a cathode separator provided on the cathode; and a voltage applier that applies a voltage between the anode and the cathode, wherein:

the compression apparatus causes, by applying the voltage using the voltage applier, protons taken out from a hydrogen-containing gas that is supplied to the anode to move to the cathode via the electrolyte membrane and produces compressed hydrogen, the anode separator has a first flow channel, provided in the second principal surface, through which a cooling fluid flows, the cathode separator has a principal surface facing away from the cathode and a second manifold through which a cathode gas containing the compressed hydrogen flows and a second communicating path, provided in the principal surface of the cathode separator, that leads the cathode gas to the second manifold, the second principal surface of the anode separator has a region facing the second communicating path, and the first flow channel is configured to surround part of the region, the part including an end facing an upstream end of the second communicating path.

* * * * *